Patented Sept. 15, 1942

2,295,561

UNITED STATES PATENT OFFICE 2,295,561

TRIAZINYL CYANOALKYL SULPHIDES

Gaetano F. D'Alelio and James W. Underwood, Pittsfield, Mass., assignors to General Electric Company, a corporation of New York No Drawing. Application June 27, 1941,
Serial No. 400,150

11 Claims. (Cl. 260—248)

This invention relates to new chemical compounds and more particularly to triazine derivatives. The invention especially is concerned with the production of new and useful symmetrical triazinyl (s-triazinyl) cyanoalkyl sulphides.

The triazinyl cyanoalkyl sulphides of this invention may be represented graphically by the following general formula:

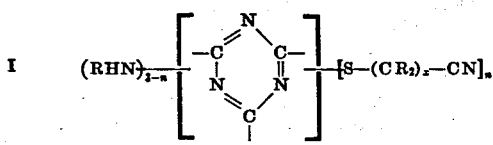

In the above formula $n$ represents an integer and is at least 1 and not more than 3, $x$ is an integer and is at least 1 and not more than 2, and R represents a member of the class consisting of hydrogen and monovalent hydrocarbon and halohydrocarbon radicals, numerous examples of which hereafter are given. Since $x$ represents an integer which is 1 or 2, it will be seen that the linkage of the cyanoalkyl group to the sulphur atom in all cases will be alpha or beta to the cyano group. It also will be observed that linkage of the triazinyl grouping to the sulphur atom is through a carbon atom. From a consideration of the formula it further will be seen that when $n$ is 3 there will be no amino (—NHR) groups attached to the triazine nucleus.

Illustrative examples of monovalent hydrocarbon radicals that R in the above formula may represent are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R is hydrogen.

Our new triazinyl cyanoalkyl sulphides may be used as chemotherapeutic agents and, also, as intermediates in the preparation of other compounds. For example, they may be employed as intermediates in the preparation of derivatives thereof such as imido ether, amidine, acyl, ureido, hydrazino, etc., derivatives of the individual triazinyl cyanoalkyl sulphide. These new organic sulphides are especially valuable as reactants in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and claimed in our copending application Serial No. 400,149, filed concurrently herewith and assigned to the same assignee as the present invention. In our copending application Serial No. 441,546, filed May 2, 1942, which application is a continuation-in-part of the present application and of application Serial No. 400,149, we have more fully described and have specifically claimed compositions of matter comprising the product of reaction of ingredients comprising an aldehyde and a compound corresponding to the general formula

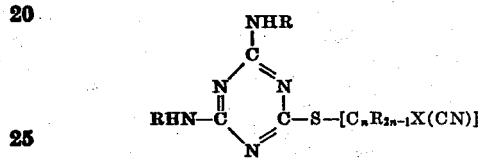

where $n$ represents an integer and is at least 1 and not more than 2, R represents a member of the class consisting of hydrogen and monovalent hydrocarbon and halo-hydrocarbon radicals, and X represents a halogen atom. The aldehyde-addition products of our new triazinyl cyanoalkyl sulphides also may be compounded with rubber, both natural and synthetic, to modify the properties of the rubber.

Various methods may be employed to produce the chemical compounds of this invention. We prefer to prepare them by effecting reaction between a mercapto s-triazine and a mono-halogenated alkyl cyanide (mono-halogenated cyanoalkane) in the presence of a hydrohalide acceptor. Illustrative examples of mercapto s-triazines that may be used, depending upon the particular s-triazinyl cyanoalkyl sulphide desired, are:

4,6-diamino 2-mercapto s-triazine
6-amino 2,4-dimercapto s-triazine
 (2-amino 4,6-dimercapto s-triazine)
2,4,6-trimercapto s-triazine
4,6-di-(methylamino) 2-mercapto s-triazine
4,6-dianilino 2-mercapto s-triazine
4,6-di-(cyclohexylamino) 2-mercapto s-triazine
4,6-ditoluido 2-mercapto s-triazine
4-benzylamino 6-methylamino 2-mercapto s-triazine, which also may be named 4-methylamino 6-benzylamino 2-mercapto s-triazine Typical examples of mono-halogenated alkyl cyanides that may be employed, depending upon the particular end-product sought, are:

Chloracetonitrile
Alpha-chlorpropionitrile
Beta-brompropionitrile
Beta-chlorbutyronitrile
Phenyl chloracetonitrile
Beta-bromo gamma-cyclohexyl butyronitrile
Beta-chloro alpha-ethyl propionitrile
Alpha-bromo alpha-methyl beta-chlorphenyl butyronitrile
Beta-chloro gamma-phenyl butyronitrile
Alpha-chloro alpha-ethyl beta-phenyl butyronitrile Illustrative examples of hydrohalide acceptors that may be used are the inorganic bases, e. g., the alkali-metal hydroxides (sodium hydroxide, potassium hydroxide, etc.), calcium hydroxide, barium hydroxide, ammonium hydroxide, etc., the carbonates of such bases, and the organic bases, e. g., tertiary amines such, for instance, as trimethyl amine, tributyl amine, dimethyl aniline, pyridine, quinoline, etc., quaternary ammonium bases (e. g., tetramethyl ammonium hydroxide, etc.), and the like. Preferably the hydrohalide acceptor is one that will react with the mercapto s-triazine to form a water-soluble salt. Examples of such preferred acceptors are sodium and potassium hydroxides.

The reaction between the mercapto s-triazine and the mono-halogenated alkyl cyanide (mono-halogenated cyano-alkane) may be carried out in any suitable manner, but preferably is effected in the presence of a suitable solvent or mixture of solvents. Although various solvents or solvent mixtures may be employed we prefer, for economic reasons and because of their eminent suitability, to use water or a mixture of water and alcohol. The reaction may be carried out under a variety of temperature and pressure conditions, for instance at normal or at elevated temperatures and at atmospheric, sub-atmospheric or super-atmospheric pressures.

The above reaction may be represented by the following general equation:

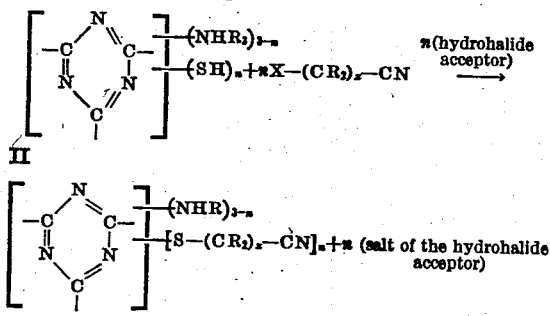

II

In the above equation X represents halogen and R, $n$ and $x$ have the same meanings as given above with reference to the general formula I for the s-triazinyl cyanoalkyl sulphides of this invention.

The chemical compounds of this invention also may be prepared by effecting reaction between a halogenated s-triazine and a mono-mercapto alkyl cyanide (mono-mercapto cyano-alkane) in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

Illustrative examples of halogenated s-triazines that may be used, depending upon the desired end-product, are:

6-chloro 2,4-diamino s-triazine (2-chloro, 4,6-diamino s-triazine)
6-iodo 2,4-diamino s-triazine
4,6-dichloro 2-amino s-triazine
2,4,6-trichloro s-triazine
6-chloro 2,4-di-(methylamino) s-triazine
4-chloro 2-amino 6-anilino s-triazine
2-chloro 4-toluido 6-ethylamino s-triazine
4,6-dibromo 2-cyclohexylamino s-triazine
6-iodo 2,4-di-(benzylamino) s-triazine Illustrative examples of mono-mercapto alkyl cyanides that may be used, depending upon the particular product desired, are:

Mercapto acetonitrile
Alpha-mercapto butyronitrile
Beta-mercapto alpha-phenyl propionitrile
Beta-mercapto beta-chlorphenyl propionitrile
Beta-mercapto beta-phenyl propionitrile
Beta-mercapto alpha-benzyl alpha-methyl butyronitrile
Beta-mercapto alpha-phenyl alpha-ethyl butyronitrile
Alpha-mercapto beta-tolyl butyronitrile
Alpha-mercapto beta-benzyl butyronitrile The hydrohalide acceptor may be the same as described above with reference to the first-named method of preparing the compounds of this invention.

The general reaction for this alternative method of preparing our new chemical compounds is illustrated by the following equation:

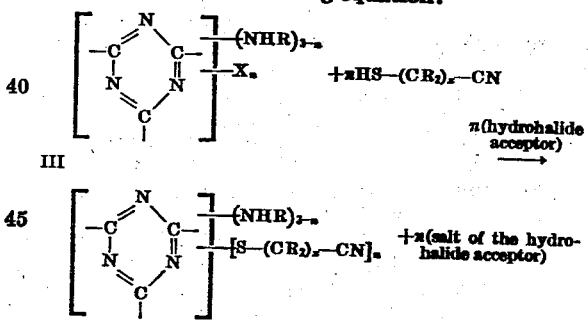

III

In this equation R, X, $n$ and $x$ have the same meanings as defined hereinbefore with reference to Formula I and Equation II.

A more specific illustration of how these new compounds may be prepared is described below with reference to the preparation of 4,6-diamino s-triazinyl-2 cyanomethyl sulphide, the formula for which is

IV

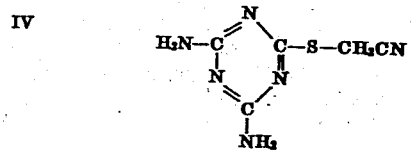

All parts are by weight.

*Example*

| | Parts |
|---|---|
| 4,6-diamino 2-mercapto s-triazine | 159 |
| Chloracetonitrile (mono-chloracetonitrile) | 84 |
| Sodium hydroxide (hydrohalide acceptor) | 44 |

The above components were mixed with 2,000 parts of water and 2,000 parts of alcohol. The mixture was allowed to react at room temperature for 24 hours, after which it was heated for 1 hour on a boiling water bath. The mixture was cooled. The product was filtered off and washed well with hot water. A yield of 161 parts of 4,6-diamino s-triazinyl-2 cyanomethyl sulphide was obtained. No attempt was made to recover any more from the mother liquor.

As it will be readily understood by those skilled in the art, when it is desired to produce compounds containing a single mono-amino triazinyl grouping and two cyanoalkyl sulphide groupings or compounds containing a triazinyl grouping and three cyanoalkyl sulphide groupings, then the starting reactants and proportions of reactants are chosen so as to yield the desired products in accordance with methods such as above given by way of illustration.

From the foregoing description it will be seen that the present invention provides new and useful s-triazinyl cyanoalkyl sulphides, examples of which are s-triazinyl tri-(cyanomethyl sulphide), s-triazinyl tri-(cyanoethyl sulphide), the monoamino (—NHR) s-triazinyl di-(cyanomethyl sulphides), the monoamino (—NHR) s-triazinyl di-(cyanoethyl sulphides), the diamino [(—NHR)₂] s-triazinyl mono-(cyanomethyl sulphides) and the diamino [(—NHR)₂] s-triazinyl mono-(cyanoethyl sulphides). Other and more specific examples of these new compounds are shown below:

V

NC—CH₂—CH₂—S—C⟨N⟩C—S—CH₂—CH₂CN
           ‖
           S—CH₂—CH₂—CN s-Triazinyl-2, 4, 6 tri-(beta-cyanoethyl sulphide)

VI

H₂N—C⟨N⟩C—S—CH₂—CN
         ‖
         S—CH₂—CN 6-amino s-triazinyl-2,4 di-(cyanomethyl sulphide)

VII

H₂N—C⟨N⟩C—S—CH₂—CH₂—CN
         ‖
         S—CH₂—CN 6-amino s-triazinyl 2-beta-cyanoethyl 4-cyanomethyl di-sulphide

VIII

CH₃—HN—C⟨N⟩C—S—CH₂—CN
            ‖
            NH—C₆H₅

4-anilino 6-methylamino s-triazinyl-2 cyanomethyl sulphide

IX

H₂N—C⟨N⟩C—S—CH₂—CH₂—CN
         ‖
         NH₂

4,6-diamino s-triazinyl-2 beta-cyanoethyl sulphide

X

H₂N—C⟨N⟩C—S—CH₂—CN
         ‖
         NH—C₆H₅

6-amino 4-anilino s-triazinyl-2 cyanomethyl sulphide

XI

H₂N—C⟨N⟩C—S—CH—CN
         |     |
         NH—C₆H₅  C₆H₅

6-amino 4-anilino s-triazinyl-2 cyano-phenylmethyl sulphide

XII

CH₃—HN—C⟨N⟩C—S—CH₂—CH₂—CN
            ‖
            NH—C₆H₄—CH₃

6-methylamino 4-toluido s-triazinyl-2 beta-cyanoethyl sulphide

XIII

H₂N—C⟨N⟩C—S—CH—CH₃
         |     |
         NH₂   CN 4,6-diamino s-triazinyl-2 alpha-cyanoethyl sulphide

XIV

CH₃—HN—C⟨N⟩C—S—CH—CH—CN
            |     |    |
            NH—CH₃ C₂H₅ C₆H₁₁

4,6-di-(methylamino) s-triazinyl-2 beta-(alpha-cyclohexyl cyanobutyl) sulphide

XV

CH₃—C₆H₄—NH—C⟨N⟩C—S—CH—CH₂CN
                |        |
                NH—C₆H₄—CH₃  CH₂—C₆H₅

4,6-di-toluido s-triazinyl-2 beta-(gamma-phenyl cyanopropyl) sulphide

XVI

C₆H₁₁—HN—C⟨N⟩C—S—CH—CH₂—CH₃
              |     |
              NH—C₆H₁₁  CN 4,6-di-(cyclohexylamino) s-triazinyl-2 alpha-cyanopropyl sulphide

XVII

C₁₀H₇HN—C⟨N⟩C—S—CH—CN
             |     |
             S—CH—CN  C₂H₅
                |
                C₂H₅

6-naphthylamino 2-triazinyl-2,4 di-(alpha-cyanopropyl sulphide)

XVIII

C₂H₅—HN—C⟨N⟩C—S—CH—CN
             |     |
             S—CH—CN  C₆H₄Cl
                |
                C₆H₄Cl 6-ethylamino s-triazinyl-2,4 di-(cyano-chlorphenylmethyl sulphide)

XIX

NC—CH—CH—S—C⟨N⟩C—S—CH—CH—CN
   |   |        |     |   |
   C₂H₅ C₆H₅    S—CH—CH—CN  C₆H₅  C₂H₅
                |   |
                C₆H₅ C₂H₅ s-triazinyl-2,4,6 tri-[beta-(alpha-phenyl cyanobutyl) sulphide]

In a manner similar to that described above with particular reference to the production of s-triazinyl cyanomethyl and cyanoethyl sulphides, corresponding asymmetrical and vicinal triazine derivatives may be prepared.

What we claim as new and desire to secure by Letters Patent of the United States is:

1. Chemical compounds corresponding to the general formula

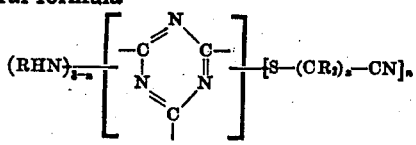

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein R represents hydrogen and $x$ is 1.

4. Symmetrical triazinyl-2,4,6 tri-(cyanomethyl sulphide).

5. A monoamino s-triazinyl di-(cyanomethyl sulphide).

6. 6-amino s-triazinyl-2,4 di-(cyanomethyl sulphide).

7. A diamino s-triazinyl cyanomethyl sulphide.

8. 4,6-diamino s-triazinyl-2 cyanomethyl sulphide.

9. The method of preparing chemical compounds corresponding to the general formula

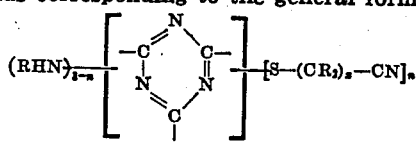

where $n$ is an integer and is at least 1 and not more than 3, $x$ is an integer and is at least 1 and not more than 2, and R is a member of the class consisting of hydrogen and monovalent hydrocarbon and halo-hydrocarbon radicals, said method comprising effecting reaction, in the presence of a hydrohalide acceptor, between (1) a mercapto s-triazine corresponding to the general formula

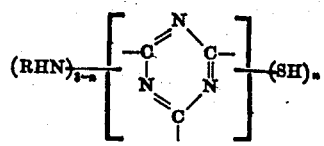

where $n$ and R have the meanings above given, and (2) mono-halogenated alkyl cyanide corresponding to the general formula

where X represents halogen and R, $n$ and $x$ have the meanings above given.

10. A method as in claim 9 wherein the hydrohalide acceptor is an alkali-metal hydroxide.

11. The method of preparing 4,6-diamino s-triazinyl-2 cyanomethyl sulphide which comprises effecting reaction, in the presence of a hydrohalide acceptor, between 4,6-diamino 2-mercapto s-triazine and chloracetonitrile.

GAETANO F. D'ALELIO.
JAMES W. UNDERWOOD.